US012668231B2

(12) United States Patent
Park et al.

(10) Patent No.: US 12,668,231 B2
(45) Date of Patent: Jun. 30, 2026

(54) VEHICLE CONTROLLING METHOD, COMPUTER READABLE STORING MEDIUM WITH COMPUTER PROGRAM CODE STORED THEREIN, AND VEHICLE HAVING CONTROLLER ACCORDING TO SAME

(71) Applicants: HYUNDAI MOTOR COMPANY, Seoul (KR); KIA CORPORATION, Seoul (KR)

(72) Inventors: Joon Young Park, Seoul (KR); Dae Ro Park, Hwaseong-si (KR); Jin Kyeom Cho, Suwon-si (KR); Sang Hun Jung, Suncheon-si (KR); Jin Uk Jeong, Hwaseong-si (KR); Sung Deok Kim, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 118 days.

(21) Appl. No.: 18/234,553

(22) Filed: Aug. 16, 2023

(65) Prior Publication Data

US 2024/0140397 A1    May 2, 2024

(30) Foreign Application Priority Data

Nov. 2, 2022    (KR) ........................ 10-2022-0144715

(51) Int. Cl.
| | |
|---|---|
| *B60W 20/40* | (2016.01) |
| *B60W 10/02* | (2006.01) |
| *B60W 10/06* | (2006.01) |
| *B60W 10/08* | (2006.01) |

(52) U.S. Cl.
CPC ............ *B60W 20/40* (2013.01); *B60W 10/02* (2013.01); *B60W 10/06* (2013.01); *B60W 10/08* (2013.01); *B60W 2710/025* (2013.01); *B60W 2710/0644* (2013.01); *B60W 2710/081* (2013.01)

(58) Field of Classification Search
CPC ...... B60W 20/40; B60W 10/02; B60W 10/06; B60W 10/08; B60W 2710/025; B60W 2710/0644; B60W 2710/081
USPC ......................................................... 701/22
See application file for complete search history.

(56) References Cited

U.S. PATENT DOCUMENTS

| | | | | | |
|---|---|---|---|---|---|
| 8,480,537 | B2 * | 7/2013 | Sano | .................... | F16H 61/0031 477/6 |
| 10,137,882 | B2 * | 11/2018 | Park | .................... | B60L 15/2054 |
| 10,344,811 | B2 * | 7/2019 | Hattori | .................. | B60K 6/387 |
| 11,059,475 | B2 * | 7/2021 | Hamano | ................ | F16H 61/18 |
| 11,204,069 | B2 * | 12/2021 | Marchlewski | .......... | F16D 48/08 |
| 11,619,185 | B1 * | 4/2023 | Perez | ..................... | B60L 50/10 701/22 |
| 12,497,047 | B2 * | 12/2025 | Cho | .................... | B60W 30/192 |

(Continued)

FOREIGN PATENT DOCUMENTS

KR          10-1518900 B1      5/2015

*Primary Examiner* — Andrew Joseph Rudy
(74) *Attorney, Agent, or Firm* — Morgan Lewis & Bockius LLP

(57)          ABSTRACT

A vehicle controlling method is for a vehicle which comprises an engine, a driving motor connected to the engine, a first clutch connected between the engine and the driving motor, a start motor connected to the engine, a transmission connected to the driving motor, and a second clutch connected between the driving motor and the transmission.

18 Claims, 9 Drawing Sheets

(56) References Cited

U.S. PATENT DOCUMENTS

| | | | | |
|---|---|---|---|---|
| 2017/0151938 | A1* | 6/2017 | Kim | F16D 48/06 |
| 2023/0011741 | A1* | 1/2023 | Tatekawa | B60W 30/18172 |

* cited by examiner (a)                              (b)

VEHICLE CONTROLLING METHOD, COMPUTER READABLE STORING MEDIUM WITH COMPUTER PROGRAM CODE STORED THEREIN, AND VEHICLE HAVING CONTROLLER ACCORDING TO SAME

CROSS-REFERENCE TO RELATED APPLICATION

The present application claims priority to Korean Patent Application No. 10-2022-0144715, filed on Nov. 2, 2022 in the Korean Intellectual Property Office, the entire contents of which is incorporated herein by reference in its entirety.

TECHNICAL FIELD

The present disclosure relates to a control method for driving a vehicle by an engine and a driving motor.

BACKGROUND

In general, a hybrid vehicle refers to a vehicle driven by an engine and a driving motor.

Illustratively, in a transmission mounted electric device (TMED) of parallel hybrid vehicles, an engine and a driving motor are connected with each other by an engine clutch, and the motor shaft is connected with the input shaft of the transmission. Here, as an example, the transmission may be a dual clutch transmission DCT. In addition, a start motor/ generator, or so-called hybrid starter generator HSG is connected to the engine to make an initial rotation at the time of starting the engine, and the engine power is used to charge the battery through the HSG, if necessary.

Driving modes of a hybrid vehicle include an electric vehicle (EV) mode in which the power of the motor is solely used to drive the vehicle, a hybrid electric vehicle (HEV) mode in which the torque of the engine is used as a main power source for driving the vehicle, and a regenerative braking (RB) mode in which braking or inertial energy is recovered through the driving motor while the vehicle being braked or running by its own inertia.

For example, as the driver depresses the accelerator pedal after starting the vehicle, the vehicle is driven in a state (i.e., EV mode) where the engine clutch is in the open state, and the starter generator operates and drives the engine when the vehicle gradually requires more driving power while it slowly accelerates. When the rotational speeds of the engine and the motor become the same, the engine clutch is engaged such that the engine and the motor together or the engine drives the vehicle, in other words, the drive mode is shifted from the EV mode to the HEV.

Generally, when the EV mode changed to the HEV mode, the engine and the motor are connected upon the engine clutch being switched from the open state to a non-slip connection state after the engine and the motor are synchronized. Here, when the engine clutch is switched to the connection state in a state where the rotation speed of the engine is equal to or less than the stall prevention minimum speed, the stop of the rotation (i.e. stall) of the engine may occur due to the load through the motor, and thus the synchronization is generally set to be achieved at a speed equal to or greater than the stall prevention minimum speed of the engine.

However, when the vehicle is climbing up a hill at a low-speed or the state of charge (SOC) is low, the engine clutch is connected in a slip state so that the engine power is transmitted to the wheels. For the reason, a dog clutch cannot be used as the engine clutch, and a friction-type clutch (hereinafter referred to simply as 'a friction clutch') is generally used.

BRIEF SUMMARY

A conventional DCT-applied TMED hybrid vehicle uses a dry friction clutch as an engine clutch, which is disadvantageous in terms of cost compared to a dog clutch.

The present disclosure proposes a new control method and a vehicle thereof that enable the use of a dog clutch as the engine clutch.

A vehicle controlling method according to an embodiment of the present disclosure is for a vehicle which comprises an engine, a driving motor connected to the engine, a first clutch connected between the engine and the driving motor, a start motor connected to the engine, a transmission connected to the driving motor, and a second clutch connected between the driving motor and the transmission.

The method comprises determining switching to a hybrid electric vehicle (HEV) mode while the vehicle is driven in an electric vehicle (EV) mode, and performing one of a synchronized connection control or an launch slip control when the switching to the HEV mode is determined, wherein the launch slip control comprises: a clutch torque control to perform one of a first slip control or a second slip control according to whether an available torque of the driving motor is equal to or greater than a first predetermined value; and a synchronization control to synchronize a speed of the engine and a speed of the driving motor.

In at least one embodiment of the present disclosure, the first predetermined value is determined in consideration of a driving request torque, wherein the first slip control is performed when the available torque of the driving motor is greater than the first predetermined value, and wherein the second slip control is performed when the available torque of the driving motor is equal to or less than the first predetermined value.

In at least one embodiment of the present disclosure, the second slip control comprises a plurality of controls classified according to an increase rate per time of the driving request torque.

In at least one embodiment of the present disclosure, the second slip control comprises: a first adjustment control corresponding to a case in which the increase rate per time of the driving request torque exceeds a second predetermined value; and a second adjustment control corresponding to a case in which the increase rate per time of the driving request torque is equal to or less than the second predetermined value.

In at least one embodiment of the present disclosure, the first adjustment control comprises determining an adjusted driving request torque by adjusting the driving request torque, and adjusting a transmission torque of the second clutch to the adjusted driving request torque.

In at least one embodiment of the present disclosure, the second adjustment control comprises adjusting a transmission torque of the second clutch to be less than the driving request torque.

In at least one embodiment of the present disclosure, the first slip control comprises adjusting a transmission torque of the second clutch to the driving request torque.

In at least one embodiment of the present disclosure, the synchronization control comprises increasing the speed of the engine to a predetermined speed or higher and controlling the speed of the driving motor to synchronize with the speed of the engine.

In at least one embodiment of the present disclosure, the increasing of the engine speed comprises increasing the engine speed using the start motor.

In at least one embodiment of the present disclosure, the controlling of the speed of the driving motor comprises increasing a torque of the driving motor to a maximum available torque.

In at least one embodiment of the present disclosure, the method further comprises determining one of the synchronized connection control or the launch slip control according to an input speed of the transmission before performing one of the synchronized connection control or the launch slip control.

In at least one embodiment of the present disclosure, the determining one of the synchronized connection control or the launch slip control comprises determining the synchronized connection control when it is determined that a first condition that the input speed of the transmission is higher than a predetermined minimum speed for preventing engine stall or a second condition that the input speed of the transmission is equal to or lower than the minimum speed for preventing engine stall but the input speed of the transmission is possible to be increased to the minimum speed for preventing engine stall by the available torque of the driving motor is satisfied.

In at least one embodiment of the present disclosure, the vehicle comprises a battery configured to supply electricity to the driving motor and the start motor is further configured to charge the battery with power generated by the engine, and wherein the available torque is determined based on a maximum torque of the driving motor, a state of charge (SOC) of the battery, and a chargeable amount by the start motor.

In at least one embodiment of the present disclosure, the synchronized connection control comprises: controlling the driving motor according to a driving request torque and increasing a speed of the driving motor to or over a minimum speed for preventing engine stall with the second clutch maintained in a non-slip connection state; controlling the engine to synchronize the speed of the engine with the speed of the driving motor at or over the minimum speed for preventing stall with the first clutch maintained in a released state; and switching the first clutch to a connection state after the speed of the engine and the speed of the driving motor are synchronized.

In at least one embodiment of the present disclosure, the method further comprises determining one of the synchronized connection control or the launch slip control according to an available torque of the driving motor before performing one of the synchronized connection control and the launch slip control.

In at least one embodiment of the present disclosure, the launch slip control further comprises maintaining the first clutch in a connection state and the second clutch in a slip connection state until the driving motor and an input speed of the transmission are synchronized after the synchronization control.

According to an embodiment of the present disclosure, a computer-readable recording medium stores one or more computer program codes for performing at least one method described above.

Also, a vehicle, according to an embodiment of the present disclosure, comprises an engine; a driving motor connected to the engine; a first clutch connected between the engine and the driving motor; a start motor connected to the engine; a transmission comprising a second clutch connected to the driving motor and configured to change a speed of the driving motor; a vehicle controller comprising at least one processor and a computer-readable recording medium storing one or more computer program codes which causes by being executed by the at least processor the vehicle controller to: determine switching to a hybrid electric vehicle (HEV) mode while the vehicle is driven in an electric vehicle (EV) mode; and perform one of a synchronized connection control or an launch slip control when the switching to the HEV mode is determined, wherein the launch slip control comprises: a clutch torque control to perform one of a first slip control or a second slip control according to whether an available torque of the driving motor is equal to or greater than a first predetermined value; and a synchronization control to synchronize a speed of the engine and a speed of the driving motor.

In at least one embodiment of a vehicle of the present disclosure, the first clutch comprises a dog clutch and the second clutch comprises a friction clutch.

In at least one embodiment of a vehicle of the present disclosure, the transmission comprises a dual clutch transmission DCT.

In accordance with one embodiment of the present disclosure, a dog clutch that is cost-effective compared to a conventional dry friction clutch can be used because the engine clutch does not require slip control.

In addition, a dog clutch according to its application does not require a hydraulic actuator for a friction clutch and a friction material that it is advantageous in reducing the weight of the vehicle and improving fuel efficiency.

DETAILED DESCRIPTION

Figure 1:
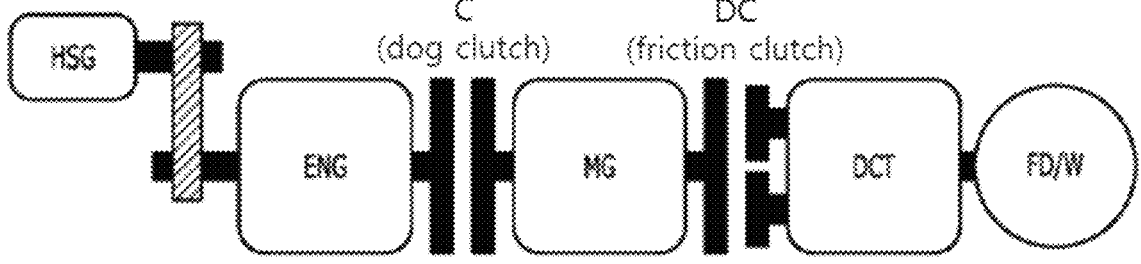
FIG. 1 is a power system diagram of a hybrid vehicle according to an embodiment of the present disclosure.

Hereinafter, the embodiments disclosed herein will be described in detail with reference to the accompanying drawings, in which the same or similar elements are given the same reference numerals regardless of the reference numerals, and redundant descriptions thereof will be omitted.

A suffix "unit" of a component used in the following description is given or combined in consideration of the ease of description and does not necessarily need to be physically divided or separated. For example, the "oo unit" may be a component that performs a function different from the "xx unit", but may be implemented such that the functions are not physically separated or divided but are performed in parallel or chronologically in one microprocessor, and the suffix "unit" does not exclude the "oo unit". This is also applied to the suffix "module".

Further, in describing the embodiments disclosed herein, when it is determined that the detailed description of the related known technology may obscure the essentials of the embodiments disclosed herein, the detailed description thereof will be omitted.

Further, it should be understood that the accompanying drawings are merely for easily understanding the embodiments disclosed in the present specification, and the technical concept disclosed in the present specification is not limited by the accompanying drawings, and all changes and equivalents included in the concept and technical field of the present disclosure are included.

Terms including ordinal numbers such as "first", "second", and the like may be used to describe various elements, but the elements are not limited by the terms. The terms are used only for the purpose of distinguishing one element from another element, and in particular, should not be construed as having only the name and determining the order among the elements.

It should also be understood that the criteria for "up/above" or "down/below" are merely used in principle to represent the relatively positional relationship among the elements with respect to the appearance shown in the drawings for convenience, and should not be understood to limit the position of the actual elements, so long as they are not naturally determined from each attributes or among the elements or otherwise expressed in the specification. For example, "B located above A" is not mentioned otherwise, or unless B should not be located above A due to the properties of A or B, it only indicates that B is shown above A in the drawings, and in the actual product or the like, B may be located below A and B and A may be disposed side by side.

The term "and/or" is used to include all instances of any combination among plurality of items to be included. For example, "A and/or B" includes all three cases such as "A", "B", and "A and B".

When it is stated that an element is "connected" or "connected" to another element, it should be understood that the element may be directly connected or linked with another element, but another component may exist in between. On the other hand, when it is mentioned that an element is "directly connected" or "directly linked" to another element, it should be understood that another element does not exist in between.

An expression in the singular includes a plurality of expressions unless the context clearly indicates otherwise.

It should be understood that the term "include" or "have" used herein is intended to designate the presence of a feature, a number, a step, an operation, a component, a part, or a combination thereof described in the specification, but it does not preclude the presence or addition of one or more other features, numbers, steps, operations, components, parts, or a combination thereof.

Unless defined otherwise, all terms used herein, including technical or scientific terms, have the same meaning as that generally understood by those skilled in the art. The terms, such as those defined in commonly used dictionaries, will further be understood and should be interpreted as having a meaning that is consistent with their meaning in the context of the relevant art and will not be interpreted in an ideal or overly formal sense unless expressly defined herein.

In addition, a unit or a control unit is a term widely used for naming a controller that outputs a control value or command for a specific function to other elements, but is not limited to a generic function unit. For example, each unit or control unit may include an input/output device for transmitting and receiving signals to and from other controllers or sensors to control a function in charge, a memory for storing an operating system or a logic command, input/output information, etc., and one or more microprocessors for determination, calculation, and determination necessary for a function in charge.

Prior to the detailed description of the embodiment of the present disclosure, the drawings will be briefly described.

Figure 2:
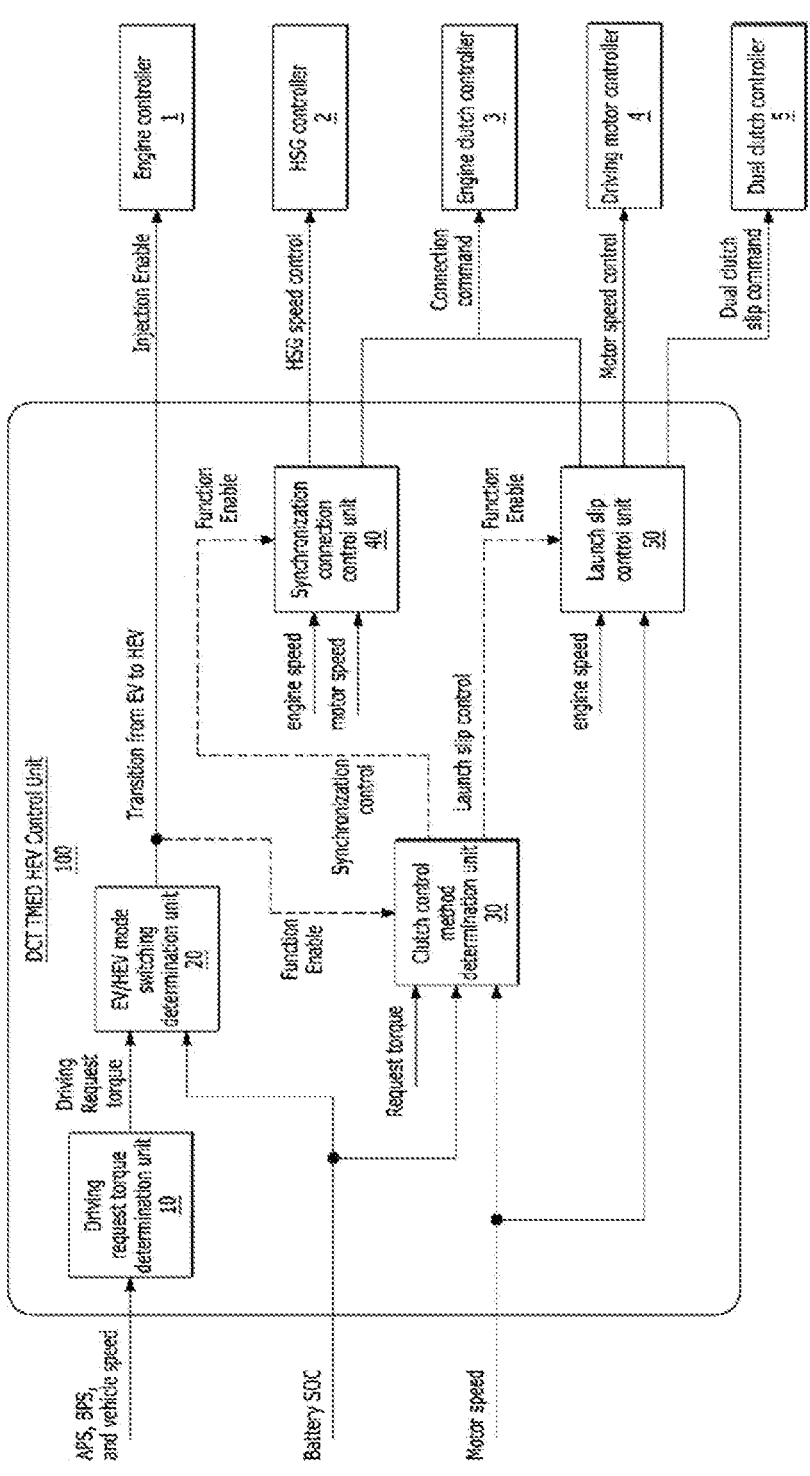
FIG. 2 is a control system diagram of a hybrid vehicle according to an embodiment of the present disclosure.
Figure 3:
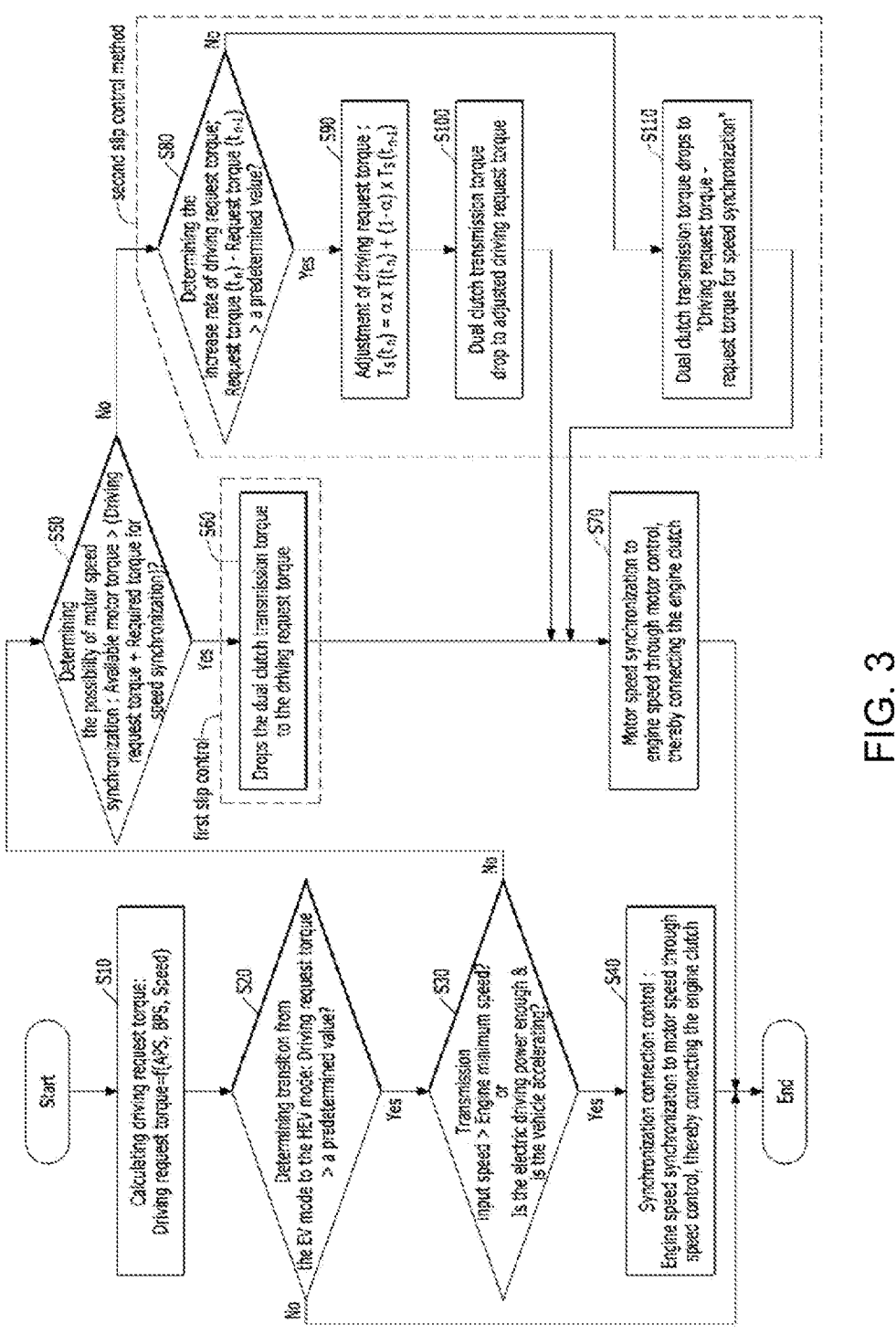
FIG. 3 is a flowchart illustrating an example of a vehicle controlling method according to an embodiment of the present disclosure.

FIG. 1 shows a power transmission system diagram of a hybrid vehicle according to an embodiment of the present disclosure, FIG. 2 shows a control system diagram of a hybrid vehicle according to an embodiment of the present disclosure, and FIG. 3 shows a flowchart of an example of a vehicle controlling method according to an embodiment of the present disclosure.

In a hybrid vehicle according to an embodiment of the present disclosure, as shown in FIG. 1, an engine ENG and a driving motor MG are connected with an engine clutch (first clutch) C interposed in between, the driving motor MG is connected with a dual clutch (second clutch) DC of a dual clutch transmission DCT, and the dual clutch transmission DCT is connected with a final drive FD and wheel L W. Further, a starter generator HSG is connected to the engine ENG.

In this embodiment, the engine clutch C is a dog clutch, and the dual clutch DC includes a multi-plate clutch which is a friction clutch.

Although not shown, the dual clutch DC may be connected to the hydraulic actuator. Clutching engagement force of the dual clutch DC is determined depending on the operating pressure of the hydraulic actuator, and accordingly, the transmission torque transmitted through the dual clutch DC is determined.

When torque of the driving motor MG is input over the transmission torque of the dual clutch DC, the dual clutch DC slips and transmits only as much an amount of the input torque of the driving motor MG as the transmission torque to the dual clutch transmission DCT.

In other words, depending on the controlling of the operating pressure of the hydraulic actuator, the dual clutch DC can be maintained in any of the disengaged, slip-connected, and non-slip-connection states. Further, in the slip-connection state, the transmission torque of the dual clutch DC may be determined according to the operating pressure of the actuator.

Hereinafter, a vehicle control process according to an embodiment of the present disclosure will be described in reference to FIGS. 2 and 3.

First, the vehicle controller 100 includes a driving request torque determination unit 10, an EV/HEV mode switching determination unit 20, a clutch control method determination unit 30, a synchronized connection control unit 40, a launch slip control unit 50, etc.

The driving request torque determination unit 10 receives information of an accelerator pedal sensor (APS), a brake pedal sensor (BPS), and a vehicle speed, and determines the driving request torque (S10).

The determined driving request torque is input to the EV/HEV mode switching determination unit 20, and the EV/HEV mode switching determination unit 20 determines whether the driving request torque exceeds a predetermined value (S20).

If it is determined that the driving request torque exceeds the predetermined value, the EV/HEV mode switching determination unit 20 determines mode switching from the EV mode to the HEV mode (Yes in S20).

The EV/HEV mode switching determination unit 20 outputs a mode switch determination to the engine controller 1 and the engine controller 1 starts and controls the engine ENG accordingly.

At the same time, the mode switch determination is input to the clutch control method determination unit 30, and the clutch control method determination unit 30 determines a clutch control method for the HEV mode switch.

In order to determine the clutch control method, the clutch control method determination unit 30 determines whether a first condition that the input speed of the transmission DCT is higher than the minimum speed for preventing engine stall is satisfied, or whether a second condition that the input speed of the transmission DCT is equal to or lower than the minimum speed for preventing engine stall and it is possible to raise the input speed of the transmission DCT to the minimum speed for preventing engine stall by the available torque of the driving motor MG, e.g., the driving force by electricity is sufficient is satisfied (S30).

In the second condition, the available torque of the driving motor MG may be determined based on the maximum torque of the driving motor MG and the battery SOC state. For example, when the SOC of the battery is sufficient, the available torque of the driving motor MG may amount to the maximum torque of the driving motor. In addition, for example, in a state in which the SOC of the battery is not sufficient, the available torque of the driving motor MG may be determined to be smaller than the maximum torque.

In determining the available torque, the battery SOC state may be based on the current SOC state of the battery, but the amount of charge that can be charged to the battery by generating power with the starter generator HSG using part of engine power may also be considered.

As an example, in the synchronized connection control (S40), when the driving request torque is not large, the available torque may be determined by additionally considering the possible amount of battery charging through the starter generator HSG in the battery SOC state. That is, for example, when the driving request torque is equal to or less than the predetermined value, the chargeable amount through the starter generator HSG is additionally considered.

Also, the second condition may further consider whether the vehicle is smoothly accelerating. When carrying load of the vehicle is large due to, for example, large loaded weight or climbing up a hill, it may be difficult to accelerate the vehicle only by the driving motor MG due to the load even though the electric driving force is sufficient. Therefore, in order to deal with this kind of case, whether the vehicle acceleration is being proceeded smoothly is additionally considered.

Whether the acceleration of the vehicle is being smoothly proceeded may be determined based on whether the acceleration of the input of the transmission DCT is equal to or greater than a predetermined value.

In this embodiment, it is not necessary to separately calculate the vehicle load, and it is possible to overcome a situation where it is difficult to calculate the accurate vehicle load, because it considers whether the vehicle acceleration is smoothly progressing without directly considering the vehicle load.

If it is determined in step S30 that either the first condition or the second condition is satisfied (Yes in S30), the synchronization control command outputs to the synchronized connection control unit 40.

The synchronized connection control unit 40 receives the information on the speed of the engine ENG and the speed of the driving motor, controls the synchronized connection, i.e., the speed of the engine ENG, and synchronizes the speed of the driving motor with the speed of the engine ENG, and later performs a control operation for switching the state of the engine clutch C to the connection state and maintaining the connection state (S40).

In an embodiment, the synchronized connection control unit 40 may output a command for speed control to the starter generator HSG controller 2 in order to synchronize the engine speed with the driving motor speed.

In addition, upon the synchronization of the speed of the engine ENG and the speed of the driving motor MG being achieved, a command for control of the engine clutch C may be output to the engine clutch controller 3, and the engine clutch controller 3 controls the engine clutch C to be switched from the released state to the connection state according to the command.

After the engine clutch C is switched to the connection state, the output of the engine ENG is increased, and the torque of the driving motor MG is reduced. In this case, the torque of the engine ENG and the torque of the driving motor MG may be controlled depending on a power distribution (i.e. load distribution for carrying the vehicle) ratio set for the engine ENG and the driving motor MG.

In the present embodiment, the speed of the engine ENG is controlled by the rotation of the starter generator HSG, but the present disclosure is not limited thereto, and the speed of the engine ENG may be directly controlled by driving the engine ENG through adjustment of the fuel injection amount.

Figure 4:
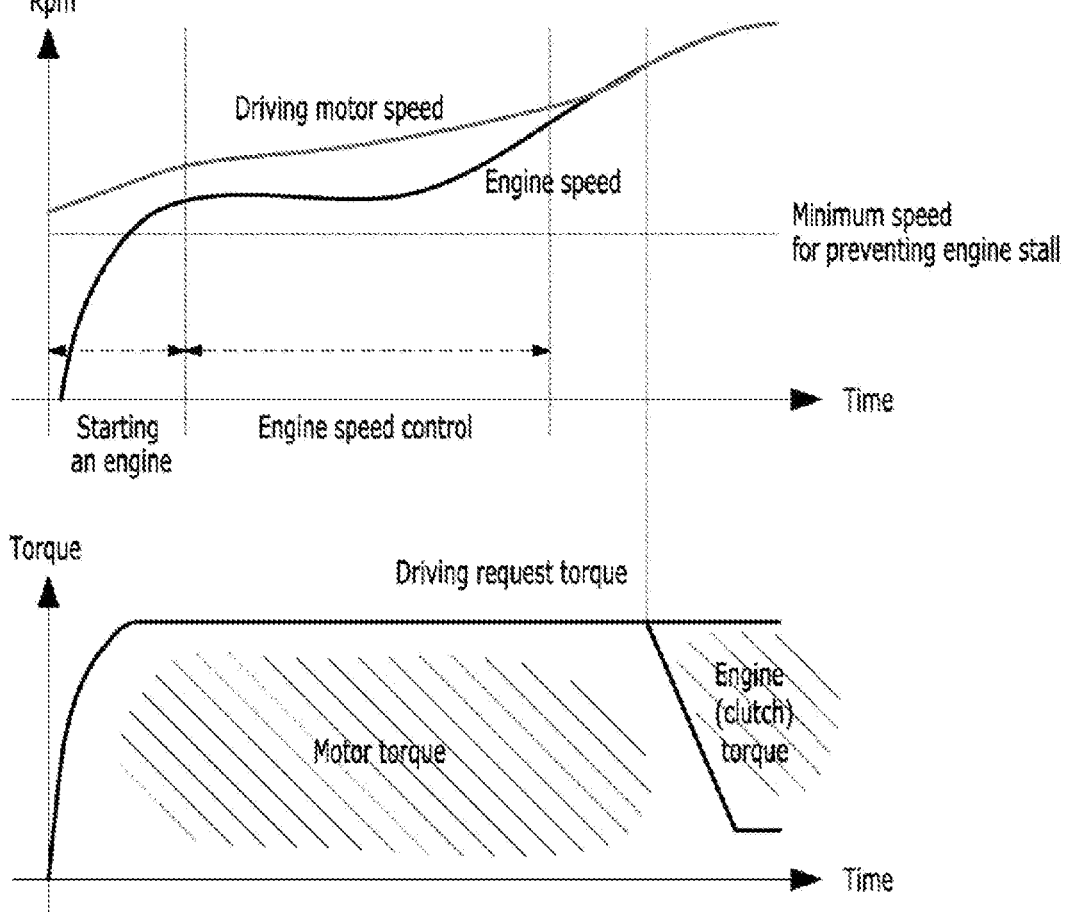
FIG. 4 is an example of a synchronized connection control of FIG. 3.

FIG. 4 shows the speed of the driving motor MG and the speed of the engine ENG according to time during the synchronized connection control process described above, and it also shows the relationship between the driving request torque and the torques of the driving motor MG and the engine ENG.

In the synchronized connection control process as shown in FIG. 4, the driving motor MG is solely in charge of the driving power of the vehicle until the power of the engine ENG can be used for driving the vehicle by the engine clutch C being switched to the connection state. While the driving motor MG is controlled to solely bear the entire driving request torque, e.g., while the engine clutch C is maintained in the released state, the engine ENG is controlled to increase the speed to the minimum speed for preventing engine stall.

When the synchronization is achieved, the engine clutch C is switched from the release, i.e. disengaged state to the connection, i.e. engaged state, and accordingly the torque of the engine ENG is used as the main power source for driving the vehicle. As described above, after the engine clutch C is switched to the connection state, the torque of the engine ENG and the torque of the driving motor MG may be controlled depending on the power distribution ratio set for the engine ENG and the driving motor MG.

In step S30, the clutch control method determination unit 30 determines launch slip control when neither the first condition nor the second condition is satisfied, thereby the launch slip control unit 50 performs launch slip control. Hereinafter, the launch slip control will be described in detail in reference to FIGS. 5 to 8.

First, it is determined whether the synchronization with the engine ENG speed is possible through speed control of the driving motor MG (S50). In addition, for the determination, it is determined whether the available torque of the driving motor MG is larger than the sum of the driving request torque and the torque required for the synchronization.

The available torque of the driving motor MG may be determined based on the maximum torque of the driving motor MG and the battery SOC state as described above. Likewise, the available battery charge amount through the HSG may be considered together with the battery SOC state.

The torque required for the speed synchronization may be calculated as a torque required to increase speed of the driving motor MG to a value equal to or higher than the minimum speed for preventing engine stall within a predetermined time (e.g., a target time for achieving synchronization of the engine ENG and the driving motor MG).

In step S50, when the available torque of the driving motor MG is sufficient, i.e., "Yes", a first slip control (S60) and the synchronization control (S70) are performed.

To this end, the launch slip control unit 50 outputs a command for controlling the coupling force of the dual clutch to the dual-clutch control unit 5 for the first slip control, and outputs a command for controlling the speed of the driving motor MG to the driving motor control unit 4 for the synchronous control (S70).

Illustratively, the launch slip control unit 50 as the first slip control command may output a control command to the dual clutch controller 5 for reducing the coupling force of the dual clutch DC so that the transmission torque is lowered to the driving request torque. In addition, the dual clutch control unit 5 controls the dual clutch actuator to drop the operating pressure of the dual clutch according to the control command.

In addition, the launch slip control unit 50, for instance, may output a speed control command for the driving motor MG to the driving motor controller 4 for following the engine ENG speed, i.e, for synchronization, by using the input engine ENG speed and the input driving motor MG speed information. For example, the speed of the driving motor MG is controlled to follow the speed of the engine ENG and thus be synchronized therewith by controlling the torque of the driving motor MG while the speed of the engine ENG is increased to the minimum speed for preventing engine stall by driving of the engine ENG and is maintained for a predetermined time or more.

Alternatively, the launch slip controller 50, for instance, may receive an input of the engine speed information, and determine as a motor control command a target time for synchronizing the speed of the driving motor MG with the engine speed which is equal to or higher than the minimum speed for preventing engine stall and the torque of the driving motor MG required for reaching the synchronization within the target time, and transmit the motor control command to the driving motor controller 4.

The driving motor controller 4 controls the driving motor MG according to the above-described control command to achieve the synchronization.

Since the transmission torque of the dual clutch DC is adjusted to the driving request torque, the torque obtained by subtracting the driving request torque from the torque output from the driving motor MG is used to increase the speed of the driving motor MG.

When the speed synchronization between the engine ENG and the driving motor MG is achieved, the launch slip control unit 50 outputs a connection command for the engine clutch C to the engine clutch control unit 3, and the engine clutch control unit 3 controls the engine clutch C to be switched to the connection state according to the output command.

Figure 5:
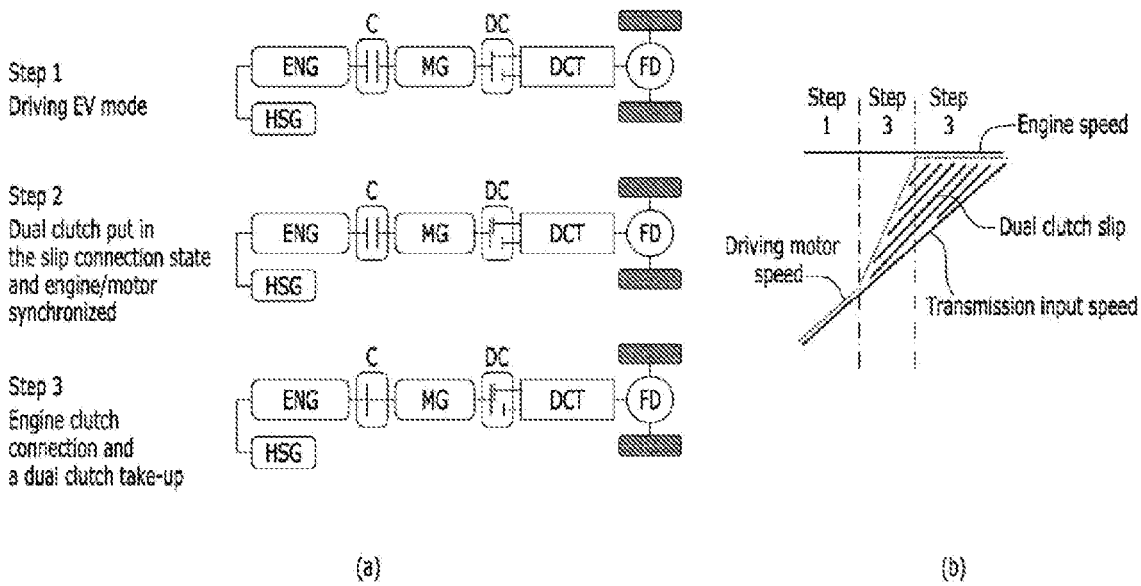
FIG. 5 illustrates examples of the first sleep control (S60) and the synchronization control (S70) of FIG. 3.
Figure 6:
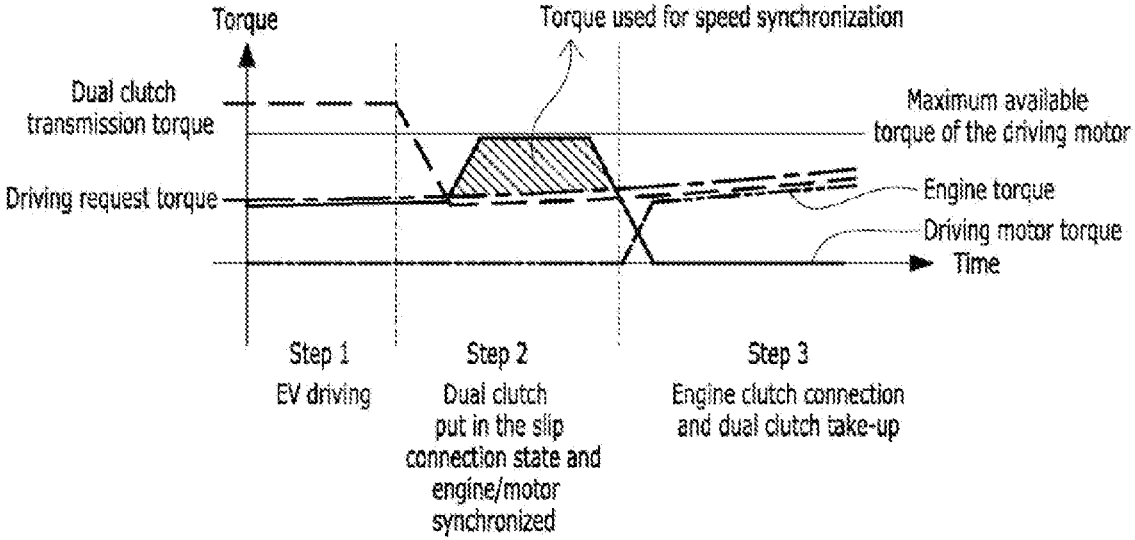
FIG. 6 illustrates a change in related torques over time in the control process of FIG. 5.

FIG. 5 illustrates control states of the engine clutch C and the dual clutch DC during the process of the first slip control and the synchronization control (S70) thereof, and FIG. 6 illustrates a dual clutch transmission torque, a driving request torque, an engine torque, and a driving motor torque according to time during the control process.

As shown in FIG. 5A, the engine clutch C is in the released state and the dual clutch DC is in a non-slip connection state during the EV mode, and as shown in FIG. 5B, the speed of the driving motor MG is the same as the speed of the input of the transmission DCT, and the speed of the engine ENG is independent of the speed of the driving motor MG (step ①).

In performing the first slip control, while the engine clutch C is maintained in the disengaged, i.e. released or open state, the dual clutch DC is switched to the engaged state, i.e. the connection state when its transmission torque is controlled to drop to the driving request torque, thereby the speed of the driving motor MG reaches the speed of the engine ENG while rising above the speed of the transmission DCT input force (step ②).

If the speed of the driving motor MG reaches the speed of the engine ENG and thus synchronization is achieved, the engine clutch C is transitioned into the engaged state, whereby the engine ENG and the driving motor MG rotate together. At this time, the engine ENG and the driving motor MG are controlled to exert as much a total combined amount of torque as the driving request torque together depending on the set power distribution ratio, Meanwhile, the dual clutch DC may be continuously controlled so that the previous torque is adjusted to the driving request torque. As time goes, the transmission torque of the dual clutch DC is increased to be in a non-slip connection state, and the speed of the engine ENG, the speed of the driving motor MG, and the speed of the input of the transmission DCT become the same (step 3).

Hereinafter, the relationship among the transmission torque of the dual clutch DC, the driving request torque, the engine torque, the driving motor torque, etc. will be described in reference to FIG. 6.

During the EV mode, the dual clutch DC is controlled to the non-slip connection state such that the transmission torque thereof is maintained at or above the driving request torque and the torque of the driving motor MG is maintained at the same level as the driving request torque.

Subsequently, the transmission torque of the dual clutch DC drops to the driving request torque, and the driving motor MG is increased to a torque equal or higher than the driving request torque, for example, to the maximum available torque of the driving motor MG.

Next, the engine clutch C is switched to the connection state in a state where the speed of the driving motor MG is synchronized with the speed of the engine ENG, thereby the torque of the engine ENG being controlled to be equal to the driving request torque and the torque of the driving motor MG being reduced. In this case, as described above, the engine ENG torque and the driving motor MG torque may be controlled depending on the power distribution ratio.

Next, in step S50, when it is determined that the available torque of the driving motor MG is not sufficient, i.e., when it is determined that the available torque of the driving motor MG is equal to or less than the sum value of the driving request torque and the torque required for speed synchronization (No in S50), a second slip control and the synchronization control according thereto (S70) are performed, and hereinafter, the second slip control will be described.

The second slip control is classified into a first adjustment control and a second adjustment control depending on an increase rate per time of the driving request torque.

In order to determine the increase rate of the driving request torque, the launch slip control unit 50, for example, may determine whether a difference of the driving request torques of subsequent time intervals exceeds a set value.

When the increase rate of the driving request torque is large, the first adjustment control is performed, and when the increase rate of the driving request torque is small, the second adjustment control is performed.

First, the first adjustment control and the corresponding synchronization control (S70) is detailed.

Because the launch slip control uses part of the output torque of the driving motor MG for speed synchronization between the driving motor MG and the engine ENG through the transmission torque control by controlling the slip connection state of the dual clutch DC, it is very difficult to perform the launch slip control when the driving request torque is rapidly increased. For the reason, the first adjustment control is performed to overcome this situation.

In the first adjustment control, an adjusted driving request torque is determined by lowering the driving request torque, and the launch slip control is performed by using the adjusted driving request torque.

Illustratively, the adjusted driving request torque from the first adjustment control may be determined by Equation 1 below.

$$T_a(t_n)=\alpha \times T(t_n)+(1-\alpha) \times T_a(t_{n-1}) \qquad \text{Equation 1:}$$

wherein, $t_n$ is the $n^{th}$ time, $t_{n-1}$ is the $n-1^{th}$ time, $\alpha$ is a real number between 0 and 1, T is a driving request torque, and $T_a$ is an adjusted driving request torque.

Figure 7:
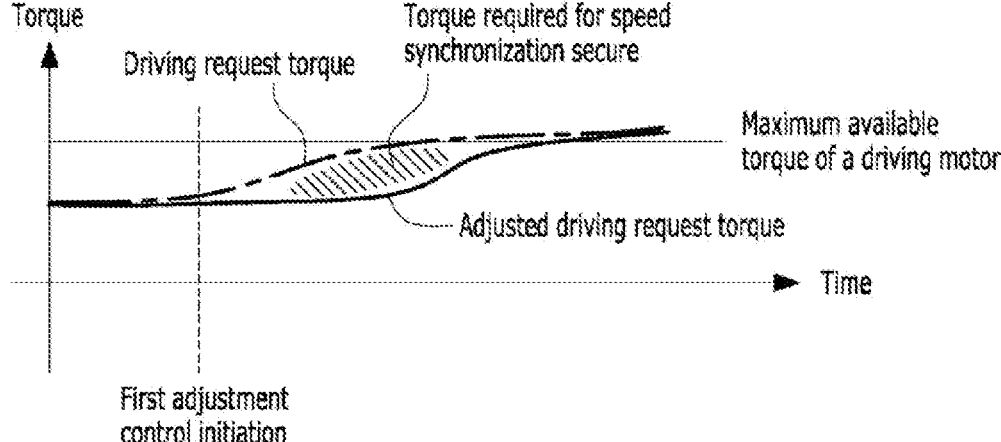
FIG. 7 illustrates a control situation in which the driving request torque is adjusted during the first adjustment control (S90 to S100) and the synchronization control (S70) of FIG. 3.

Referring to FIG. 7 for instance, although the driving request torque is increased to the maximum available torque of the driving motor MG as the driving request torque is rapidly increased, the adjusted driving request torque is limited for its increase until finally reaching the driving request torque.

The first adjustment control and the corresponding synchronization control (S70) are the same as the first slip control and the corresponding synchronization control (S70) except that the adjusted driving request torque is used instead of the driving request torque. In other words, the transmission torque of the dual clutch DC is not dropped to the driving request torque but it is dropped to the adjusted driving request torque (S100), and then the synchronization control (S70) is performed.

Next, the second adjustment control will be described with reference to FIG. 8.

The second adjustment control is a control method for other cases in which the available torque of the driving motor MG is not sufficient, but it is not due to a rapid increase in the driving request torque.

Illustratively, the maximum available torque of the driving motor MG may be reduced due to an abnormality occurred in the power system including the battery and the like or the driving motor MG, and in this case, the launch slip control may be completed through the second adjustment control.

Figure 8:
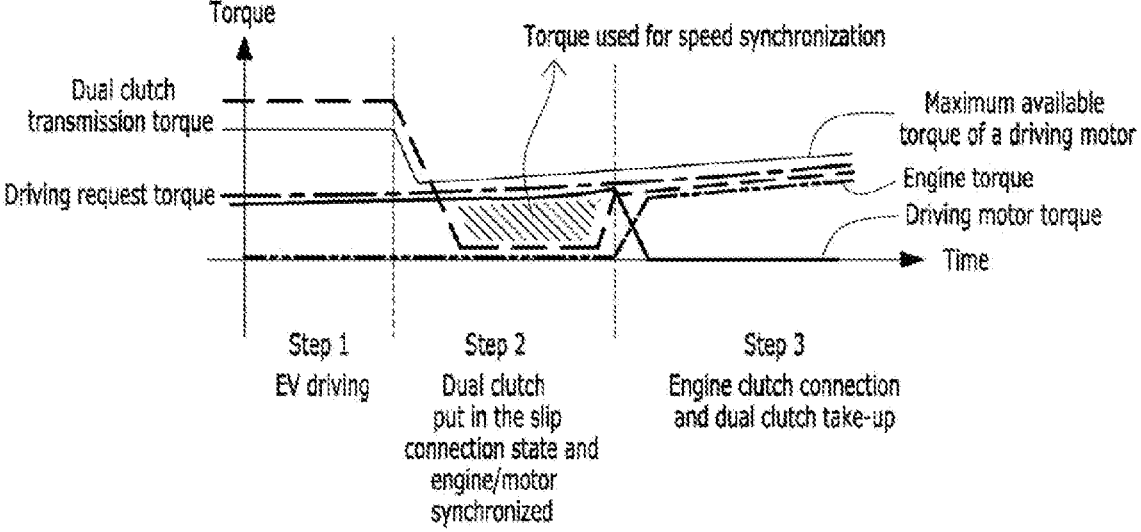
FIG. 8 illustrates a change in related torques over time in the second adjustment control (S110) and the synchronization control (S70) of FIG. 3.

Referring to FIG. 8, during normal driving by the EV mode, the maximum available torque of the driving motor MG is reduced, and thus the difference from the driving request torque may be slight.

As the launch slip control for this case, the second adjustment control and the synchronization control according to the second adjustment control are performed (S70).

In the second adjustment control as shown in FIG. 8, the transmission torque of the dual clutch DC is decreased to a value obtained by subtracting the torque required for speed synchronization from the driving request torque (S110). Through this, the remaining torque of the output torque of the driving motor MG after excluding the torque amount corresponding to the transmission torque of the dual clutch DC is used for synchronizing the speed of the driving motor MG to the speed of the engine ENG to complete the synchronization (S70).

When the speed synchronization of the driving motor MG and the engine ENG is achieved, the engine clutch tooth C is switched to the engaged state, the dual clutch DC is maintained in the slip connection state until the speed of the driving motor MG and the input speed of the transmission are synchronized, and the transmission torque is controlled according to the driving request torque.

The engine ENG torque is controlled according to the driving request torque, the speed of the engine ENG, the speed of the driving motor MG, and the speed of the input of the transmission DCT become the same as time goes, and the state of the dual clutch DC becomes the non-slip state gradually.

Figure 9:
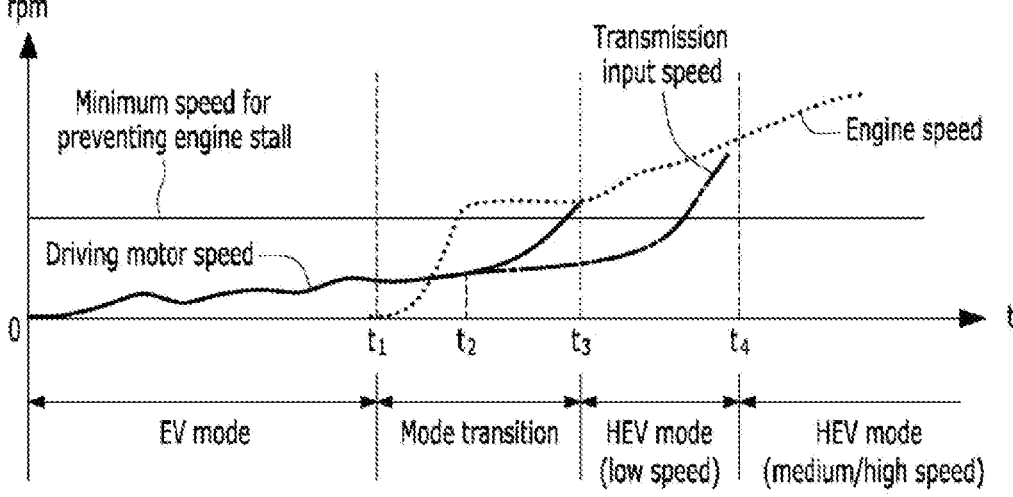
FIG. 9 illustrates a control process along with changes relevant to its speed according to an embodiment of the present disclosure.

Meanwhile, FIG. 9 illustrates a control process according to an embodiment of the present disclosure together with changes in the related speed.

The EV mode in which the vehicle is driven only by the driving motor MG is executed during the initial driving (0 to t1) after the vehicle is started.

Next, when the switching to the HEV mode is determined (Yes in S20) and the launch slip control is determined (No in S30), the first slip control or the second slip control and the synchronization control according thereto (S70) are performed (t1 to t3) for the mode transition.

Specifically, in a state in which the engine clutch C is maintained at the released state, the engine ENG is started and controlled to operate at a speed equal to or higher than the minimum speed for preventing engine stall. At this time, the dual clutch DC is switched to the slip connection state at a time of t2, and the speed of the driving motor MG is controlled to be synchronized according to the speed of the engine ENG at a time of t2 to t3. The driving motor MG may be controlled such that the torque thereof rises to the maximum available torque for speed control for synchronization.

When the speed of the engine ENG is synchronized with the speed of the driving motor MG according to the speed control of the driving motor MG, the engine clutch C that is maintained in the released state is changed to the connection state at the time of t3. Thereafter, the output torque of the driving motor MG is decreased, and the output torque of engine ENG is increased so that the vehicle is in the low-speed driving state of the HEV mode (t3 to t4).

Since the transmission torque of the dual clutch DC and the torque of the engine ENG are controlled to be matched to the driving request torque in the HEV mode, the input speed of the transmission DCT is increased to the speed of the engine ENG over time, and the vehicle is in the middle/high speed state of the HEV mode.

In the present embodiment, the driving request torque determination unit 10, the EV/HEV mode switching determination unit 20, the clutch control method determination unit 30, the synchronized connection control unit 40, the launch slip control unit 50, and the like may be implemented by a microprocessor and a memory, respectively. That is, for example, the driving request torque determination unit 10 may be implemented as a memory storing computer program instructions for performing the functions and a processor which is configured to read in the program instructions from the memory to execute the instructions. In addition, the EV/HEV mode switching determination unit 20, the clutch control method determiner 30, the synchronized connection controller 40, the launch slip controller 50, and the like may be similarly implemented. According to an exemplary embodiment of the present disclosure, the vehicle controller 100 and its components such as the driving request torque determination unit 10, the EV/HEV mode switching determination unit 20, the clutch control method determination unit 30, the synchronized connection control unit 40 and the launch slip control unit 50 may include a processor (e.g., computer, microprocessor, CPU, ASIC, circuitry, logic circuits, etc.) and an associated non-transitory memory storing software instructions which, when executed by the processor, provides the functionalities of them as described here. Herein, the memory and the processor may be implemented as separate semiconductor circuits. Alternatively, the memory and the processor may be implemented as a single integrated semiconductor circuit. The processor may embody one or more processor(s).

In addition, the driving request torque determination unit 10, the EV/HEV mode switching determination unit 20, the clutch control method determination unit 30, the synchronized connection control unit 40, and the launch slip control unit 50 may be implemented as a single integrated microprocessor and a memory. That is, for example, computer program instructions for performing functions of the driving request torque determination unit 10, the EV/HEV mode switching determination unit 20, the clutch control method determination unit 30, the synchronized connection control unit 40, and the launch slip control unit 50 may be stored in a memory, and the integrated microprocessor may read the instructions as necessary to perform the instructions.

What is claimed is:

1. A vehicle controlling method for a vehicle which comprises an engine, a driving motor connected to the engine, a first clutch connected between the engine and the driving motor, a start motor connected to the engine, a transmission connected to the driving motor, and a second clutch connected between the driving motor and the transmission, the method comprising:

determining switching to a hybrid electric vehicle (HEV) mode while the vehicle is driven in an electric vehicle (EV) mode; and performing one of a synchronized connection control or a launch slip control when the switching to the HEV mode is determined, wherein the launch slip control comprises:

a control to perform one of a first slip control or a second slip control based on a determination whether an available torque of the driving motor is equal to or greater than a first predetermined value; and a synchronization control to synchronize a speed of the engine and a speed of the driving motor, wherein the first predetermined value is a value determined based on a driving request torque, wherein the first slip control is performed in response to a determination that the available torque of the driving motor is greater than the first predetermined value, and wherein the second slip control is performed in response to a determination that the available torque of the driving motor is equal to or less than the first predetermined value.

2. A computer-readable recording medium storing one or more computer program codes for performing the method of claim 1.

3. The method of claim 1, wherein the second slip control comprises a plurality of controls which are determined based on an increase rate per time of the driving request torque, the second slip control include a first adjustment control and a second adjustment control, the first adjustment control corresponding to a case in which the increase rate per time of the driving request torque exceeds a second predetermined value, and the second adjustment control corresponding to a case in which the increase rate per time of the driving request torque is equal to or less than the second predetermined value.

4. The method of claim 3, wherein the second predetermined value is a threshold used to compare a difference between the driving request torque at subsequent time intervals for determining the increase rate per time of the driving request torque.

5. The method of claim 3, wherein the first adjustment control comprises:

determining an adjusted driving request torque by adjusting the driving request torque, and adjusting a transmission torque of the second clutch to the adjusted driving request torque.

6. The method of claim 3, wherein the second adjustment control comprises: adjusting a transmission torque of the second clutch to be less than the driving request torque.

7. The method of claim 1, wherein the first slip control comprises: adjusting a transmission torque of the second clutch to the driving request torque.

8. The method of claim 1, wherein the synchronization control comprises: increasing the speed of the engine to a predetermined speed or higher and controlling the speed of the driving motor to synchronize with the speed of the engine.

9. The method of claim 8, wherein the increasing the speed of the engine comprises: increasing the speed of the engine using the start motor.

10. The method of claim 8, wherein the controlling the speed of the driving motor comprises: increasing a torque of the driving motor to a maximum available torque.

11. The method of claim 1, further comprising: determining one of the synchronized connection control or the launch slip control according to an input speed of the transmission before performing one of the synchronized connection control or the launch slip control.

12. The method of claim 11, wherein the determining one of the synchronized connection control or the launch slip control comprises: determining the synchronized connection control in response to a determination of a first condition or a second condition wherein the first condition represents that the input speed of the transmission is higher than a predetermined minimum speed for preventing engine stall and the second condition represents that the input speed of the transmission is equal to or lower than the predetermined minimum speed for preventing engine stall and the input speed of the transmission is possible to be increased to the predetermined minimum speed for preventing engine stall by the available torque of the driving motor.

13. The method of claim 12, wherein the vehicle comprises a battery configured to supply electricity to the driving motor and the start motor is further configured to charge the battery with power generated by the engine, and wherein the available torque is determined based on a maximum torque of the driving motor, a state of charge (SOC) of the battery, and a chargeable amount by the start motor.

14. The method of claim 1, wherein the synchronized connection control comprises:

controlling the driving motor based on a driving request torque and increasing a speed of the driving motor to or over a minimum speed for preventing engine stall with the second clutch maintained in a non-slip connection state;

controlling the engine to synchronize the speed of the engine with the speed of the driving motor at or over the minimum speed for preventing stall with the first clutch maintained in a released state; and switching the first clutch to a connection state after the speed of the engine and the speed of the driving motor are synchronized.

15. The method of claim 1, further comprising: determining one of the synchronized connection control or the launch slip control based on an available torque of the driving motor before performing one of the synchronized connection control and the launch slip control.

16. The method of claim 1, wherein the launch slip control further comprises: maintaining the first clutch in a connection state and the second clutch in a slip connection state until the driving motor and an input speed of the transmission are synchronized after the synchronization control.

17. A vehicle, comprising:

an engine;

a driving motor connected to the engine;

a dog clutch connected between the engine and the driving motor;

a start motor connected to the engine;

a transmission comprising a friction clutch connected to the driving motor and configured to change a speed of the driving motor;

a vehicle controller comprising at least one processor and a computer-readable recording medium storing one or more computer program codes which causes by being executed by the at least processor the vehicle controller to:

determine switching to a hybrid electric vehicle (HEV) mode while the vehicle is driven in an electric vehicle (EV) mode; and perform one of a synchronized connection control or a launch slip control when the switching to the HEV mode is determined, wherein the launch slip control comprises:

a control to perform one of a first slip control or a second slip control according to whether an available torque of the driving motor is equal to or greater than a first predetermined value; and a synchronization control to synchronize a speed of the engine and a speed of the driving motor.

18. The vehicle of claim 17, wherein the transmission comprises a dual clutch transmission DCT.

* * * * *